United States Patent
Held et al.

(10) Patent No.: US 6,709,594 B2
(45) Date of Patent: *Mar. 23, 2004

(54) METHOD FOR TREATING WASTE-ACTIVATED SLUDGE USING ELECTROPORATION

(75) Inventors: Jeffrey Held, Chicago, IL (US); Satya P. Chauhan, Columbus, OH (US)

(73) Assignee: DH20, L.L.C., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/270,420

(22) Filed: Oct. 15, 2002

(65) Prior Publication Data

US 2003/0080053 A1 May 1, 2003

Related U.S. Application Data

(63) Continuation-in-part of application No. 10/107,614, filed on Mar. 26, 2002, now Pat. No. 6,540,919, which is a continuation of application No. 09/612,776, filed on Jul. 10, 2000, now Pat. No. 6,395,176, which is a continuation-in-part of application No. 09/468,427, filed on Dec. 21, 1999, now abandoned, which is a continuation of application No. 09/229,279, filed on Jan. 13, 1999, now Pat. No. 6,030,538, which is a continuation-in-part of application No. 08/934,548, filed on Sep. 22, 1997, now Pat. No. 5,893,979, which is a continuation-in-part of application No. 08/552,226, filed on Nov. 2, 1995, now Pat. No. 5,695,650.

(51) Int. Cl.$^7$ .............................................. C02F 1/461
(52) U.S. Cl. ..................... 210/609; 205/751; 210/610; 210/622; 210/624; 210/626; 210/748; 422/22
(58) Field of Search ............................. 210/606, 609, 210/610, 622, 624, 625, 626, 748, 764, 768, 808; 205/751; 422/22

(56) References Cited

U.S. PATENT DOCUMENTS

| | | | | |
|---|---|---|---|---|
| 3,913,500 A | * | 10/1975 | Paccione et al. | 110/224 |
| 5,695,650 A | * | 12/1997 | Held | 210/748 |
| 5,846,425 A | * | 12/1998 | Whiteman | 210/606 |
| 5,893,979 A | * | 4/1999 | Held | 210/748 |
| 6,030,538 A | * | 2/2000 | Held | 210/748 |
| 6,395,176 B1 | * | 5/2002 | Held et al. | 210/610 |
| 6,491,820 B2 | * | 12/2002 | Held et al. | 210/609 |
| 6,540,919 B2 | * | 4/2003 | Held et al. | 210/609 |

* cited by examiner

Primary Examiner—Peter A. Hruskoci
(74) Attorney, Agent, or Firm—Much Shelist

(57) ABSTRACT

A method of treating of municipal sludge, paper-pulp sludge, animal and plant waste, and the like, whereby the treatment thereof via electroporation causes the breakdown of waste activated sludge, which is then recycled back to a bioreactor, or to one or more additional bioreactors such as aerobic, facultative, anoxic, or strictly anaerobic.

13 Claims, 1 Drawing Sheet

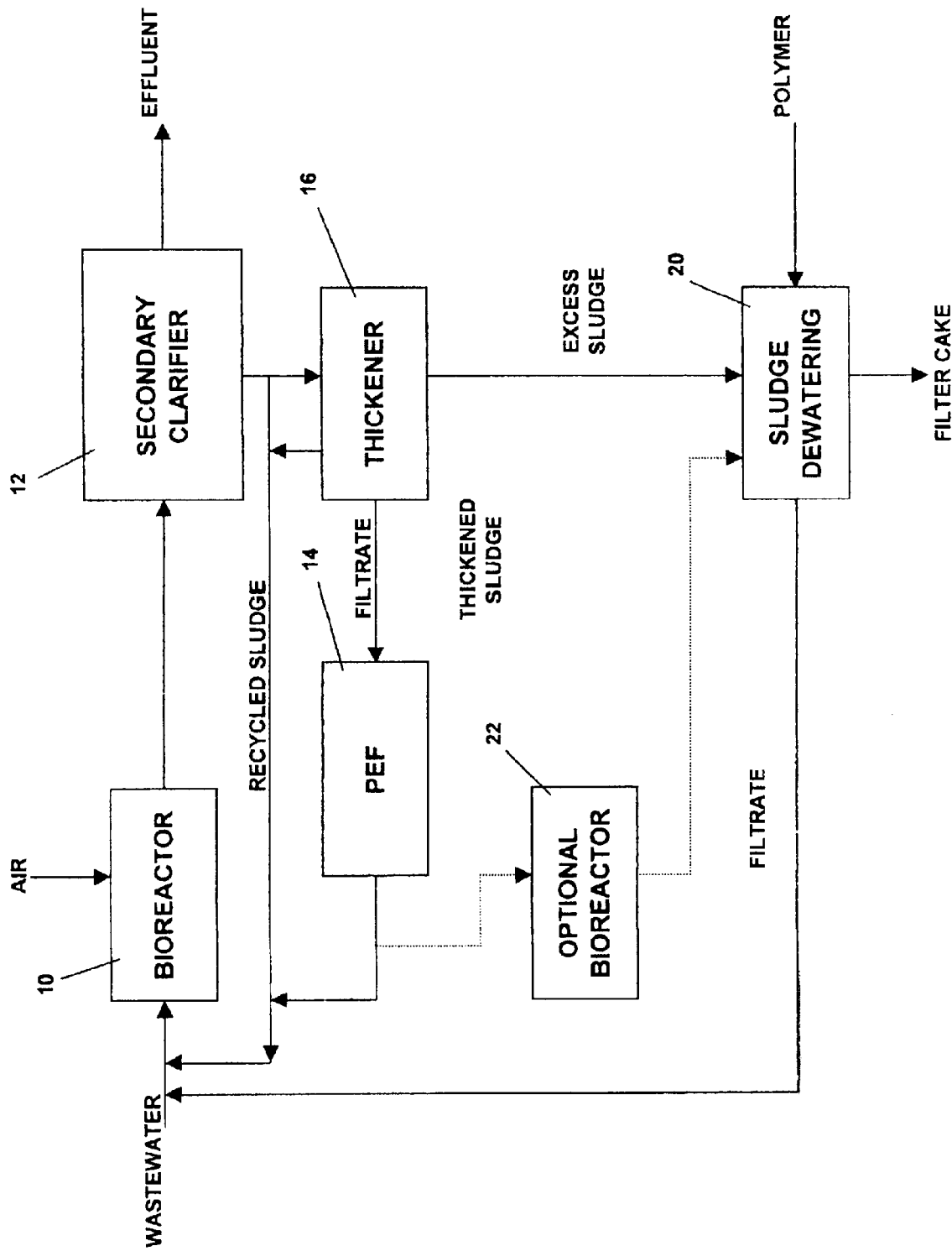

METHOD FOR TREATING WASTE-ACTIVATED SLUDGE USING ELECTROPORATION

CROSS REFERENCE TO RELATED APPLICATION

This is a continuation-in-part of application Ser. No. 10/107,614, filed Mar. 26, 2002, now U.S. Pat. No. 6,540,919, which is incorporated by reference herein, which is a continuation of application Ser. No. 09/612,776 filed on Jul. 10, 2000, now U.S. Pat. No. 6,395,176, which is incorporated by reference herein, which is a continuation-in-part of application Ser. No. 09/468,427, filed on Dec. 21, 1999, now abandoned, which is a continuation of application Ser. No. 09/229,279, filed on Jan. 13, 1999, now U.S. Pat. No. 6,030,538, which is incorporated by reference herein, which is a continuation-in-part of application Ser. No. 08/934,548, filed on Sep. 22, 1997, now U.S. Pat. No. 5,893,979, which is a continuation-in-part of application Ser. No. 08/552,226, filed on Nov. 2, 1995, now U.S. Pat. No. 5,695,650, which is incorporated by reference herein.

BACKGROUND OF THE INVENTION

In U.S. Pat. No. 6,030,538, issued in Feb. 29, 2000 entitled "Method and Apparatus for Dewatering Previously-Dewatered Municipal Waste-Water Sludges Using High Electrical Voltages", there is disclosed a system and method for dewatering and treating sludge emanating from municipal waste, or pulp-waste from a paper mill, as well as treating animal and plant waste. In that patent, the method for breaking down the sludge is to subject it to electroporation, which incorporates nonarcing, cyclical high voltages in the range of between 15 kv./cm and 100 kv./cm. which break down inter-cellular and intracellular molecular bonds of waste-activated sludge (WAS), to thus release inter-cellular and intracellular water, whereby the WAS is rendered inactive and greatly reduced in mass.

The viability and effectiveness of pulse electric field (PEF) for disrupting the biomass in waste activated sludge (WAS) derived from municipal wastewater treatment has been proven in laboratory testing and on-site pilot projects. While there was no significant increase in the solids content of dewatered sludge, the quantity of WAS needing disposal was estimated to be significant reduced. The pilot plant for testing at one or two wastewater treatment plants that generate WAS has been developed and deployed. A pulsed electric field (PEF) system that could handle 0.5 to 1.0 pgm WAS feed was designed. This requires an 8 kw power supply capable of generating 30 kV and pulse generator capable of handling 50 amp peak, current, bi-polar pulses, square wave, 10 $\mu$s pulse width, and 3000 pulses/second (pps).

SUMMARY OF THE INVENTION

It is the primary objective of the present to provide a treatment of municipal sludge, paper-pulp sludge, animal and plant waste, and the like, whereby the treatment thereof via electroporation causes the breakdown of waste activated sludge, which is then cycled either back to a previous bioreactor, and/or to one or more additional bioreactors, such as aerobic, facultative, anoxic, or strictly anaerobic.

BRIEF DESCRIPTION OF THE DRAWING

The invention will be more readily understood with reference to be accompanying drawing, wherein:

FIG. 1 is a schematic showing the process for electroporating sludge in order to break up and destroy the waste-activated sludge for transport to one or more bioreactors.

DETAILED DESCRIPTION OF THE INVENTION

Referring to FIG. 1, there is shown the schematic for using the PEF-electroporation system as a secondary treatment for previously-dewatered sludge. In FIG. 1, the primary-treated wastewater is delivered to a bioreactor 10, which may or may not be provided with air depending upon the type of bioreactor used, as described hereinbelow. The bioreactor 10 may be aerobic, facultative, anoxic, or strictly anaerobic. From there the sludge may be sent to an optional secondary clarifier 12, if necessary. From there, the sludge may be recycled directly back to the bioreactor 10. The sludge may be optionally thickened at thickener 16, with excess sludge being sent to a sludge dewatering unit 20 for further dewatering for forming a filter cake. From sludge dewatering unit 20, the filtrate is recycled back to the bioreactor 10. The filtrate exiting the bioreactor 10, either directly or through secondary clarifier 12 and thickener 16, is delivered to electroporating device 14, which provides a pulsed electric field (PEF) with voltages between 15 kv./cm. and 100 kv./cm., as disclosed in detail in the above-mentioned patents and applications. The waste-activated sludge (WAS) treated by the electroporation device 14 is broken up and destroyed, releasing intracellular and inter-cellular water, and organic solids-contents. The PEF process is applicable to biomass contained in biological sludges from all the types of secondary wastewater treatment bioreactors. The PEF process is effective because it lyses cells, and the resulting cells become more readily available as food when those treated cells are fed to a bioreactor.

The PEF-treated sludge is then delivered to one or mote bioreactors. It may be recycled back to the bioreactor 10, to one or more optional bioreactors 22, or to both the bioreactor 10 and optional bioreactor or bioreactors 22. If delivered to optional bioreactor 22, the filtrate therefrom is transported to the sludge watering device 20.

The bioreactors, or biological cells, 10, 22 may be either strictly aerobic (requiring oxygen), facultative (able to function with or without oxygen), anoxic (low or no dissolved oxygen conditions), or strictly anaerobic (no dissolved oxygen). The fundamental structure of the cells is the same in all of these regimes for the purpose of PEF treatment and application. Each type of these microorganisms' cells are subject to electroporation, the development of holes in the cell wall due to the PEF electropulsing, and those cells become a food source when fed to the bioreactor. The bioreactor that receives the cells does not have to be the same type from which the microorganism cells have originated, but may be in any of these regimes, i.e., aerobic, anoxic, facultative, or anaerobic, as they may be used as food by microorganisms in any of these regimes. In addition, the PEF-treated cells may be chemotrophs or autotrophs, either or both of which are found in the different biological treatment systems. In all cases, the different types of biomass from the various bioreactors used in wastewater treatment can be treated with the PEF process, with similar electroporation of cells resulting.

While a specific embodiment of the invention has been shown and described, it is to be understood that numerous changes and modifications may be made therein without departing from the scope and spirit of the invention as set forth in the appended claims.

What we claim is:

1. A method of treating biomass contained in municipal or industrial biological wastewater treatment sludge, paper-pulp sludge, animal or plant waste sludge, containing intracellular water molecules contained in molecular cellular units, comprising:

(a) directing the biomass to an electroporating station;

(b) electroporating the biomass for destroying at least most of the individual cellular units of the biomass in order to release the intra-cellular water molecules contained therein; and said step (b) causing massive disruption of the cellular matter, allowing for the release of bound as well as intra-cellular liquids and intracellular dissolved/ organic matter; and (c) directing the released intracellular dissolved/organic matter to a bioreactor for performing biological digestion thereon whereby the intracellular, dissolved organic matter is used as food for microorganisms in the bioreactor.

2. The method according to claim 1, wherein said step (c) comprises delivering the destroyed biomass of said step (b) to at least one of: an aerobic, anoxic, facultative, or anaerobic bioreactor.

3. The method according to claim 1, further comprising, before said step (a):

(d) transporting wastewater from a primary treatment apparatus to at least one bioreactor of a secondary treatment apparatus;

(e) said step (c) comprising recycling the released intracellular dissolved/organic matter back to said at least one bioreactor of said step (d).

4. The method according to claim 3, wherein said step (e) comprises delivering the destroyed biomass of said step (b) to one of: an aerobic, anoxic, facultative, or anaerobic bioreactor.

5. The method according to claim 3, wherein said secondary treatment apparatus further comprises a sludge dewatering apparatus; said step (c) further comprising;

(f) delivering the destroyed biomass of said step (b) to another bioreactor downstream from said at least one bioreactor and upstream of said sludge dewatering apparatus.

6. The method according to claim 5, wherein said step (f) comprises delivering the destroyed biomass of said step (b) to one of: an aerobic, anoxic, facultative, or anaerobic bioreactor.

7. The method according to claim 1, further comprising, before said step (a):

(d) transporting wastewater from a primary treatment apparatus to a secondary treatment apparatus;

said secondary treatment apparatus comprising a sludge dewatering apparatus; said step (c) comprising delivering the destroyed biomass of said step (b) to a bioreactor upstream of said sludge dewatering apparatus.

8. A method of treating wastewater comprising:

(a) delivering said wastewater to at least one bioreactor;

(b) digesting the wastewater in said bioreactor, said bioreactor digesting the wastewater to create a waste biological sludge including cellular units and bound intracellular dissolved organic matter;

(c) delivering said waste biological sludge to an electroporation apparatus;

(d) electroporating said waste biological sludge in said electroporation apparatus by exposing said waste biological sludge to a pulsed electric field to disrupt said cellular units and to release said bound intracellular dissolved organic matter; and (e) delivering said dissolved organic matter to at least one of: said at least one bioreactor and an alternative bioreactor for reaction therewith;

said step (e) comprising supplying said dissolved organic matter as food for microorganism said at least one bioreactor or said alternative bioreactor.

9. The method according to claim 8, wherein said step (e) comprises delivering said dissolved organic matter to at least one of: an aerobic, anoxic, facultative, or anaerobic bioreactor.

10. The method according to claim 8, further comprising:

(f) thickening said waste biological sludge before said step (d).

11. The method according to claim 8, further comprising:

(f) clarifying said waste biological sludge before said step (d).

12. The method according to claim 8, further comprising:

(f) after said step (e), delivering the digested waste biological sludge of said alternative bioreactor to a sludge-dewatering device for forming filter cakes thereby.

13. The method according to claim 12, wherein said step (e) comprises delivering said dissolved organic matter to said alternative bioreactor consisting of one of: an aerobic, anoxic, facultative, or anaerobic bioreactor.

* * * * *

UNITED STATES PATENT AND TRADEMARK OFFICE
Certificate

Patent No. 6,709,594 B2                                                                                         Patented: March 23, 2004

On petition requesting issuance of a certificate for correction of inventorship pursuant to 35 U.S.C. 256, it has been found that the above identified patent, through error and without any deceptive intent, improperly sets forth the inventorship.
   Accordingly, it is hereby certified that the correct inventorship of this patent is: Jeffrey Held, Chicago, IL (US); Satya P. Chauhan, Columbus, OH (US); and Anthony J. Tomasello, Libertyville, IL (US).

Signed and Sealed this Fifth Day of February 2008.

DUANE S. SMITH
*Supervisory Patent Examiner*
Art Unit 1724